United States Patent [19]
Itakura

[11] 3,990,419
[45] Nov. 9, 1976

[54] AIR CLEANER FOR USE WITH AN INTERNAL COMBUSTION ENGINE

[75] Inventor: Masamichi Itakura, Toyota, Japan

[73] Assignee: Toyota Jidosha Kogyo Kabushiki Kaisha, Toyota, Japan

[22] Filed: Sept. 25, 1974

[21] Appl. No.: 509,064

[30] Foreign Application Priority Data
May 20, 1974 Japan.................................. 49-56349

[52] U.S. Cl. .............................. 123/119 B; 55/419; 55/510; 123/198 E
[51] Int. Cl.² ...................... F02F 9/00; F02M 25/06
[58] Field of Search ........ 123/119 B, 195 C, 198 C, 123/198 E; 60/304, 305, 306, 307; 55/337, 419, 510

[56] References Cited
UNITED STATES PATENTS

| | | |
|---|---|---|
| 3,063,440 | 11/1962 | Tuzzalino .................... 123/119 B |
| 3,186,391 | 6/1965 | Kennedy ........................... 55/510 |
| 3,277,876 | 10/1966 | Abts ............................... 123/119 B |
| 3,290,869 | 12/1966 | Lentz et al. ........................ 55/510 |
| 3,339,533 | 9/1967 | Nordstrom ......................... 55/337 |
| 3,401,518 | 9/1968 | McWhirter ......................... 60/305 |
| 3,589,108 | 6/1971 | Dingel ............................. 123/119 B |
| 3,774,399 | 11/1973 | Nohira et al. ....................... 60/307 |

*Primary Examiner*—Wendell E. Burns
*Assistant Examiner*—David D. Reynolds
*Attorney, Agent, or Firm*—Stewart and Kolasch, Ltd.

[57] ABSTRACT

An air cleaner for intake air of an internal combustion engine wherein one end of a pressure balancing tube connected to a space confined within a crank case of the engine communicates with to an air cleaner outlet chamber space from which the intake air for the engine is taken out through a main port, characterized in that a port communicating with said one end of the pressure balancing tube is positioned to border on said main port.

3 Claims, 3 Drawing Figures

AIR CLEANER FOR USE WITH AN INTERNAL COMBUSTION ENGINE

BACKGROUND OF THE INVENTION

1. Field of the Invention:

The present invention relates to an air cleaner for use with an internal combustion engine.

2. Description of the Prior Art:

An air cleaner for use with an internal combustion engine generally includes an annular filter element, wherein the air which is introduced into the filter element from the outer peripheral portion thereof traverses the filter element in the radial direction and after the dust etc. contained therein is removed, the cleaned air reaches an outlet chamber space formed at the central portion of the annular filter element. From this chamber the clean air is drawn into an intake tube incorporating a carbureter, etc., of an internal combustion engine.

On the other hand, gas which leaks out of a combustion chamber of an internal combustion engine through a clearance between a piston and a cylinder wall is called blow-by gas which remains in the crank case. This blow-by gas is fed from the crank case to an intake manifold by way of a PCV valve so that it is reintroduced into the combustion chamber. In this case, in order to avoid vacuum being generated within the crank case due to a vacuum in the intake manifold, the crank case space is connected to the outlet chamber space of the filter element in the air cleaner by way of a conduit means. However, when the engine is operating in a high speed and high load condition with a corresponding increased amount of the blow-by gas, or when the PCV valve has failed to open, a positive pressure is generated in the crank case, whereby the blow-by gas flows into the air cleaner by way of said conduit means. In this case, if stagnation of the blow-by gas is generated in the air cleaner, the filter element is contaminated, whereby the intake efficiency and the output power is lowered, causing an unfavorable affect on the quality of the exhaust gases.

Furthermore, in modern vehicles, many of which are equipped with an air pump to purify the exhaust gases, if the intake air for the air pump is taken from the outlet chamber space of the filter element of the air cleaner for the engine, an air intake port for the air pump will also be opened to said outlet chamber space. In the case where these two ports, one communicating with the space within the crank case of the engine and the other communicating with the intake port of the air pump, are simultaneously opened to the outlet chamber space of the filter element, if the blow-by gas has been blown into the air cleaner, a large amount of oil mist contained in the blow-by gas is drawn into the air pump, whereby wear on carbon shoe supporting vanes of the air pump occurs, thereby producing abbrasive powder which causes still further wear of the carbon shoe. This abnormal wear on the carbon shoe results in a rattling rotation of the rotor and, ultimately, failure of the vanes. It is generally recognized that if oil of about 1cc/hour is introduced into an air pump, the air pump lifetime is shortened to one tenth of normal expectancy.

SUMMARY OF THE INVENTION

Therefore, it is a primary object of this invention to solve the aforementioned problems and to provide an improved air cleaner of a type comprising a first port which communicates with an air intake tube of an internal combustion engine and a second port which communicates with one end of a pressure balancing tube which connects a space confined within a crank case of the engine with the chamber space located at the outlet side of a filter element, whereby the blow-by gas discharged from said second port does not stagnate in said outlet chamber space defined at a central portion of the filter element.

According to the present invention, the above-mentioned object is accomplished by positioning said second port so as to border on said first port. When said second port is positioned to border on said first port, the blow-by gas discharged from said second port is instantly drawn into said first port before it stagnates in said filter outlet chamber space, and is then fed to the engine together with the intake air and effectively recombusted.

A further object of the present invention is to prevent blow-by gas, especially oil mist contained therein, which has been discharged into said air cleaner outlet chamber space, from being drawn into an air pump when a third port which communicates to one end of an air intake tube of said air pump opens to said air cleaner outlet chamber space.

This object is accomplished by said third port being positioned substantially opposite to said second port with respect to the central axis of said first port.

By the abovementioned arrangement wherein said second port, which communicates with the space confined in the crank case, is positioned substantially opposite to said third port, with respect to the central axis of said first port, the blow-by gas, especially oil mist contained therein, discharged from said second port is drawn into the intake tube of the engine through said first port before it traverses said first port toward said third port, thereby effectively avoiding the possibility of blow-by gas or oil mist reaching said third port and being drawn in by the air pump.

According to another particular feature of the present invention, said second and third ports may preferably be spaced separately along said central axis of said first port. If the arrangement of the pressure balancing tube for providing communication between the space confined within the crank case and said filter outlet chamber space and the pipe which connects said chamber space to the inlet port of the air pump with respect to the engine and the air cleaner does not allow the end of the pressure balancing tube on the air cleaner to border on said first port, a passage should preferably be provided between said end of the pressure balancing tube on the air cleaner side and said second port. When the end of the pressure balancing tube on the air cleaner side cannot be positioned opposite to the air cleaner end of the air intake tube for the air pump with respect to the central axis of said first port, a passage should preferably be provided between the end of the pressure balancing tube on the air cleaner side and said second port, and/or the air cleaner end of the air intake tube for the air pump and said third port.

When a carbureter of the two-barrelled type is employed, said second port should preferably border on a region of the cross sectional area of said first port which corresponds to the primary side of the two-barrelled type carbureter. By this arrangement, the blow-by gas or oil mist discharged from said second port is effectively drawn into said first port over the whole operating condition of the engine, whereby stagnation of the blow-by gas or oil mist in said filter outlet chamber space with its further traversing of said first port to reach said third port is effectively avoided.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
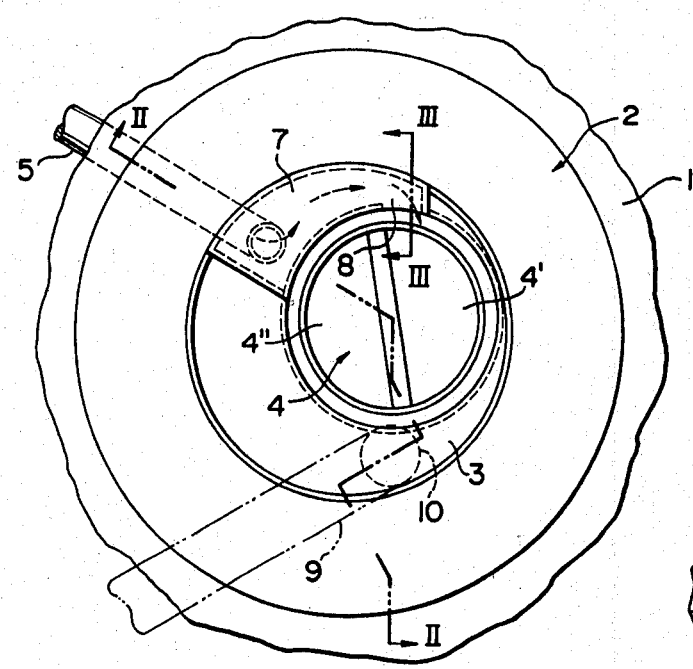
FIG. 1 is a plan view of an embodiment of the air cleaner according to the present invention, wherein the top portion of the casing is removed for the purpose of illustration.

In the following, the present invention will be described in more detail with respect to the preferred embodiment and with particular reference to the accompanying drawing.

The embodiment shown in the drawing and explained hereinunder is provided with a third port which opens to the air cleaner outlet chamber space to take in air for an air pump. However, it is to be noted that this invention is not limited to a structure equipped with said third port.

Figure 2:
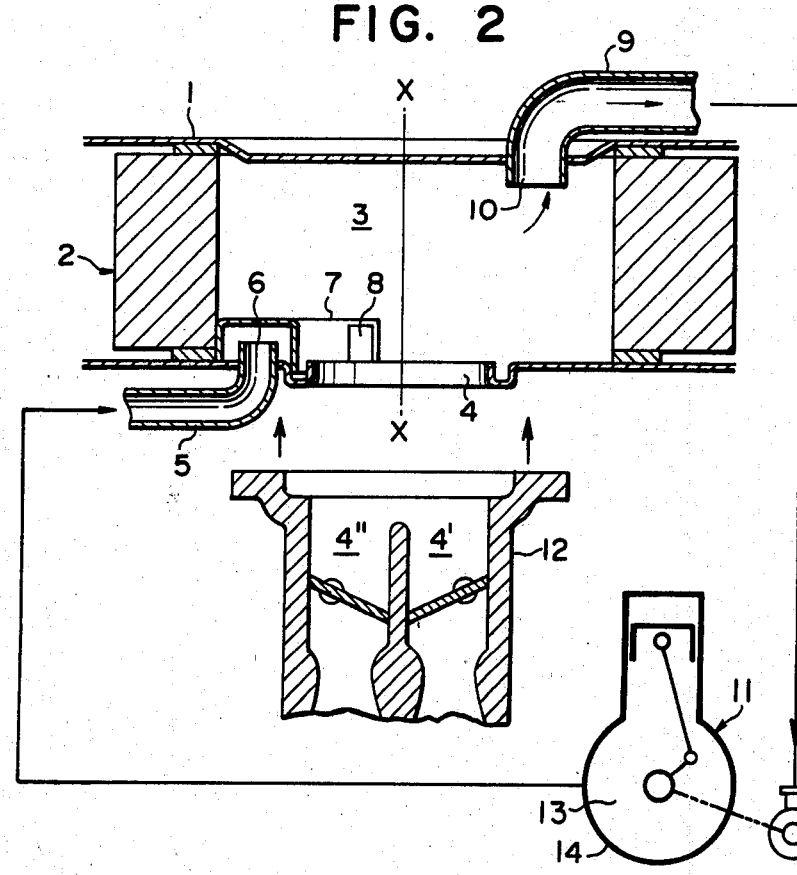
FIG. 2 is a sectional view along line II—II in FIG. 1.

Referring to the attached drawing, reference numeral 1 designates a portion of an air cleaner casing in which is mounted an annular filter element 2 which defines an outlet chamber space 3 at its central portion, said chamber space being adapted to be filled with air filtered through the filter element. Into said filter outlet chamber space 3 there opens a first port 4 which communicates with an intake tube of the engine 11, or, more generally, an inlet portion of a carburetor 12. Furthermore, into said chamber space there opens a second port 8 which communicates with an end portion 6 of a pressure balancing tube 5 by way of an arcuate passage 7, said pressure balancing tube being led from a space 13 confined within the crank case 14 of the engine. Furthermore there opens into said chamber a third port 10 which communicates with an air intake tube 9 which leads to an inlet port 15 of an air pump 16, driven by the engine 11. As better shown in FIG. 2, the port 8 is positioned adjacent to the port 4 and borders on the same, while the port 10 is positioned substantially opposite to the port 8 with respect to axis X—X of the port 4. Furthermore, the port 10 is spaced from the port 8 along the axis X—X.

In the shown embodiment, the right half portion 4' of the port 4 as seen in FIG. 1 corresponds to a primary region of a carburetor of a two-barrelled type such as carburetor 12 connected to said port, while the left half portion 4'' as seen in FIG. 1 corresponds to a secondary region of said two-barrelled type carburetor. The port 8 is positioned to border on said primary region 4'. In the shown embodiment, due to a convenient arrangement of the pressure balancing tube 5 and the air intake tube 9 for the air pump, the open end 6 of the pressure balancing tube 5 is connected to said port 8 by the arcuate passage 7.

Figure 3:
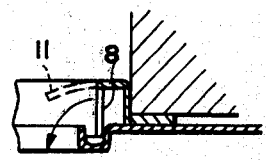
FIG. 3 is a sectional view along line III—III in FIG. 1.

As shown in broken lines in FIG. 3, the port 8 may be provided with a guide hood 11 adapted to guide the blow-by gas or oil mist discharged from the port 8 more favourably toward said first port 4.

Although the end portion 6 of the pressure balancing tube 5 communicates with the port 8 by way of the arcuate passage 7 to extend its flow passage in the shown embodiment, it will be apparent that the end of the air pump inlet tube 9 may be more conveniently extended around the axis of the port 4 by means of a suitable arcuate passage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An air cleaner for an internal combustion engine comprising a casing, an annular filter element disposed in said casing, said casing and said filter element defining, in cooperation, a central outlet chamber, first, second and third ports opening into said outlet chamber, said first port communicating with the inlet portion of a carburetor of the internal combustion engine, said second port communicating with a pressure balancing tube which connects a space confined within a crank case of the engine with said outlet chamber, said third port communicating with an air intake tube of an air pump, and an arcuate conduit which extends along the periphery of said first port for connecting the end of said pressure balancing tube with said second port, wherein said second port borders on a relatively limited peripheral portion of said first port while said third port is disposed opposite to said second port with respect to the center of said outlet chamber.

2. The air cleaner of claim 1, wherein said second port borders on a primary port of a two-barrelled type carburetor.

3. The air cleaner of claim 1, wherein said second port is provided with a guide hood for guiding the flow discharged therefrom toward said first port.

* * * * *